(12) United States Patent
Lelkes et al.

(10) Patent No.: US 6,208,113 B1
(45) Date of Patent: Mar. 27, 2001

(54) SYSTEM FOR CONTROLLING THE ROTATION OF AC MOTORS

(75) Inventors: András Lelkes, Künzelsau; Jens Krotsch, Niederstetten, both of (DE)

(73) Assignee: ebm Werke GmbH & Co. (DE)

( * ) Notice: Subject to any disclaimer, the term of this patent is extended or adjusted under 35 U.S.C. 154(b) by 0 days.

(21) Appl. No.: 09/399,664

(22) Filed: Sep. 21, 1999

(30) Foreign Application Priority Data

Sep. 21, 1998 (DE) .............................................. 198 43 106

(51) Int. Cl.[7] .................................................. H02P 5/28
(52) U.S. Cl. .................... 318/807; 318/758; 318/765; 318/821; 318/757; 318/766; 318/828
(58) Field of Search .................... 318/758, 765, 318/821, 757, 766, 828

(56) References Cited

U.S. PATENT DOCUMENTS

| 4,134,038 | 1/1979 | Kosak et al. |
| 4,266,175 | * 5/1981 | Braun et al. ........................ 318/758 |

FOREIGN PATENT DOCUMENTS

| 408045A1 | 1/1991 | (EP) . |
| 1404019 | 8/1975 | (GB) . |
| WO 97/20381 | 6/1997 | (WO) . |

* cited by examiner

Primary Examiner—Karen Masih
(74) Attorney, Agent, or Firm—Harness, Dickey & Pierce P.L.C.

(57) ABSTRACT

The present invention relates to a system for controlling the rotation speed of AC motors, in particular single phase motors. In this case, a controllable electronic switching device is connected upstream of the motor and is actuated by a control unit such that a sinusoidal input AC voltage is used to produce a motor AC voltage which can be varied in order to change the rotation speed. The control unit is designed in such a manner that the fundamental frequency and/or the amplitude of the motor AC voltage can be varied by phase gating.

36 Claims, 10 Drawing Sheets

SYSTEM FOR CONTROLLING THE ROTATION OF AC MOTORS

BACKGROUND AND SUMMARY OF THE INVENTION

The present invention relates to a system for controlling the rotational speed of AC motors, in particular capacitor motors or shaded-pole motors, in which case a controllable electronic switching device which is connected upstream of the motor is actuated by a control unit such that a sinusoidal input AC voltage is used to produce a motor AC voltage which can be varied in order to change the rotation speed.

As a rule, capacitor or shaded-pole motors are operated from a single-phase AC power supply and are used, for example, for driving fans, pumps or the like. In the case of such drives, for example in the case of fans, it is frequently necessary for various power levels (airflow levels) to be available, normally in specific steps, for different operating modes. Thus, for example in the case of fume extraction hoods, various fan rotation speeds may be used in order to vary (increase/reduce) the airflow. It is also often necessary to adjust the rotation speed, particular in steps, in air-conditioning systems, heat exchangers or, in an entirely general manner, in the case of fan and pump drives (flow machines).

At relatively low power levels, it is generally normal for this purpose to connect series resistors of different magnitudes in the current path to the motor via a stepping switch, in order in this way to achieve a reduction in the motor voltage, and thus to change the rotation speed. However, this method is very uneconomic since the voltage dropped on the resistor causes a power loss, that is to say is converted into heat, which in many cases also still has to be dissipated.

DE 42 22 431 Al discloses a stepped winding switching system for single-phase electric motors, in which it is possible to switch between a plurality of auxiliary windings by means of a plurality of triacs or thyristors, in order to vary the rotation speed. However, such winding switching is complex since winding starts and winding ends must be routed to the exterior in order to connect them. Furthermore, a separate switching element (triac, thyristor) must be provided for each switching step.

DD 94 666 discloses a system of the generic type mentioned above. This document specifically describes a method for setting the rotation speed of brushless induction motors, in particular of asynchronous squirrel-cage rotor motors. In this case, a switching device in the form of two back-to-back connected thyristors is connected upstream of the motor, or of the motor winding, and these are driven by a control device such that entire half-cycles or full-cycles of the power supply voltage are respectively switched off or switched on (passed through). This allows the frequency of the motor voltage to be varied. However, it has been found that such actuation results in relatively poor efficiency.

Similar methods are in each case disclosed in DD 216 586 and DE 28 42 391 Al, although these relate specifically to applications for three-phase or polyphase motors. In this case as well, however, entire cycles of the power supply voltage are in each case switched off or passed through as the motor voltage.

DE 38 30 196 Al discloses a method for using phase-gating controllers as frequency converters. In this case as well, entire cycles of the power supply voltage are in each case switched off by always presetting a correspondingly large, unchanging (constant) gating angle. This is thus, actually, not a phase-gating controller in the conventional sense, since the individual cycles are always either passed through completely or not at all, but are never actually only partially gated. Cyclically changing between half cycles which are switched on and switched off results in a voltage profile whose fundamental frequency is the desired, wanted frequency.

On the other hand, DE 34 27 479 Al has now also disclosed a method for gating control of voltage half cycles of a three-phase controller having two current paths (which can be controlled in parallel but in opposition) per phase, for a squirrel-cage rotor motor. In this case, in order to operate three-phase motors at stepped operating rotation speeds, positive and/or negative half-cycles are gated in accordance with various patterns in such a manner that a frequency which differs from the power supply frequency is achieved in order to vary the rotation speed in an appropriate manner. However, this method relates exclusively to three-phase motors and not to single phase AC motors, such as capacitor motors or shaded pole motors.

All these known control systems have the main disadvantage of relatively poor efficiency. In some cases, disturbing noise also occurs.

The present invention is based on the object of providing a control system of this generic type, by means of which optimum, low-noise motor operation is achieved, in particular with improved efficiency and an improved torque profile, over a wide rotation speed setting range and, preferably, largely independently of the load. In this case, it is also intended to be possible to achieve the control method using technically simple and cost effective means.

This is achieved according to the invention in that the control unit is designed in such a manner that the fundamental frequency and/or the amplitude of the motor AC voltage can be varied by phase gating, with the individual half-cycles having periodically recurring triggering angles. The period length in this case governs the fundamental frequency. It is thus possible, according to the invention, to use the input AC voltage normally from the power supply voltage to generate virtually any desired number of motor AC voltages with different fundamental frequencies and/or waveforms, thus making it possible to achieve motor operation that is always optimum, in particular with good efficiency and a high starting torque.

The fundamental frequency can be varied in a manner known per se by the control unit switching of specific half cycles or full cycles of the sinusoidal input AC voltage in order to form voltage gaps, and passing through other specific cycles. According to the invention, phase gating of successive voltage half cycles with "asymmetric" phase-gating angles (triggering angles) which are the same but, in particular, differ, can be carried out in combination with this. This is dynamic phase-gating control. In a particularly advantageous refinement for example for the 25 Hz fundamental frequency the invention in this case provides that, in the case of a full cycle which follows a voltage gap, the phase-gating angle of the first half-cycle is greater than the phase-gating angle of the subsequent, second half-cycle, to be precise in particular with a ratio such that a motor current resulting from the motor AC voltage produced in this way has a profile which is essentially symmetrical with respect to the zero line. This measure according to the invention is based an the knowledge that, in the case of known methods in which entire cycles are in each case switched off and voltage gaps are produced in this way, the cycle which occurs after a voltage gap initially leads to a relatively steep current rise, to be precise owing to the fact that there is still not back-emf in the motor winding at this time. However, after this, the current then decreases as the emf caused by the flux builds up, thus resulting in an asymmetric current profile relative to the zero line; the current then has a DC voltage element since it is shifted relative to the zero line, which also, in consequence, leads to poor efficiency. This asymmetry of the motor current is advantageously compensated for by the dynamic phase-gating control according to the invention, so that a motor current profile can be achieved which is symmetrical with respect to the zero line and has no DC voltage element. In this way, the efficiency is improved, and the energy consumption is minimized.

Further advantageous refinement features of the invention are contained in the dependent claims and in the following description.

BRIEF DESCRIPTION OF THE DRAWINGS

The invention as well as its technical background will now he explained in more detail with reference to the drawings.

DETAILED DESCRIPTION OF THE PREFERRED EMBODIMENT

In the various figures in the drawing, identical parts are always provided with the same reference symbols and are thus, as a rule, described only once in each case.

Figure 1:
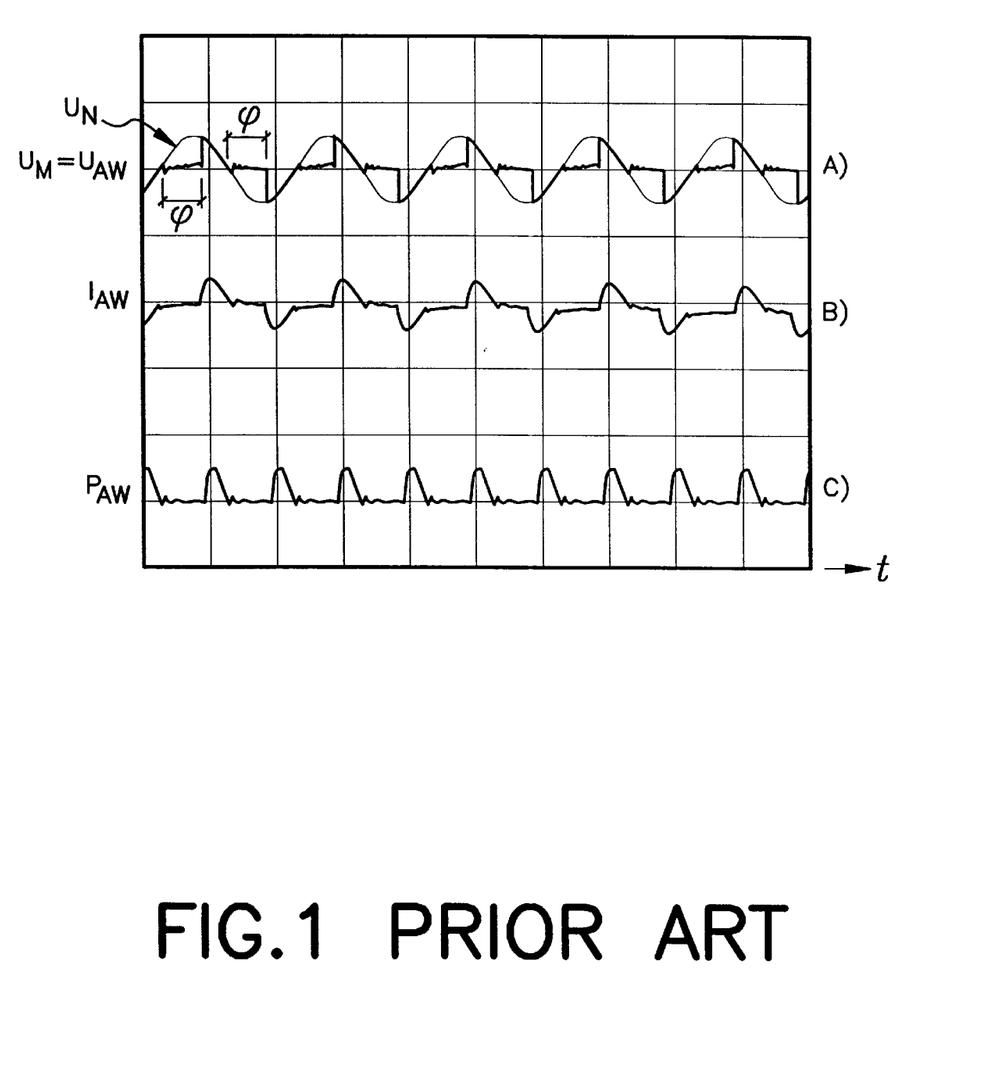
FIG. 1 shows a timing diagram for the voltage, current and power profile of a known phase-gating control system according to the prior art.
Figure 5:
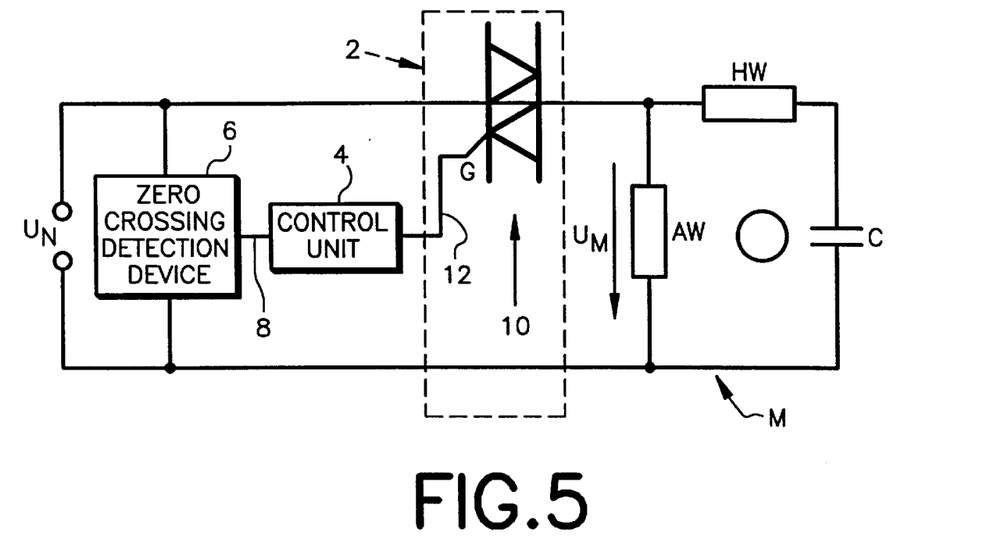
FIG. 5 shows a block diagram of a first circuit variant of the control system according to the invention.

According to FIG. 5, a controllable electronic switching device 2 is connected upstream of an AC motor. The switching device 2 is preferably formed by electronic power switches, in particular triacs or thyristors, in which case an additional driver stage can also be provided between the control unit 4 and the power switch. In this case, the motor M is in the form of a capacitor motor, which has a main winding AW and, in parallel with it, a series circuit formed by an auxiliary winding HW and a capacitor C. The motor M may also be in the form of a shaded pole motor, in which case there is no auxiliary winding HW or capacitor C. The switching device 2 is actuated by a control unit 4 such that a motor AC voltage $U_M$, which can be varied in order to change the motor rotation speed, is produced from a sinusoidal input AC voltage (power supply voltage) $U_N$. Before describing the invention in more detail, known methods will be explained with reference to FIGS. 1 to 3. In one known phase-gating control system, see FIG. 1, relating to this a switching element (triac or thyristor) connected in series with the motor is switched on with a delay, that is to say only at a specific phase or triggering angle φ after the normal zero crossing of the input AC voltage $U_N$. The amplitude of the motor AC voltage $U_M$ can be controlled by this triggering delay, by varying the triggering angle. By way of example, FIG. 1 shows the situation for a triggering angle of φ=117°. Since a capacitor motor generally operates with a high cos φ, it behaves in a similar way to a resistive load when phase-gating control is used. This means that the switching element switches itself off again in the vicinity of the voltage zero crossing, and is not switched on again until the next triggering pulse occurs. The variation in the amplitude of the motor voltage, which is dependent on the triggering angle φ, leads to a corresponding change in the rotation speed of the motor. With a control system of this type, the synchronous frequency of the motor remains unchanged; this results in a so called slip speed control system which, however, is associated with an increased power loss. The output power from the motor is thus reduced, since a proportion of the airgap power is converted into heat in the rotor. Slip speed control does not vary the idle rotation speed but the torque/rotation speed characteristic, with flatter characteristics being produced as the triggering angle is increased further.

Figure 2:
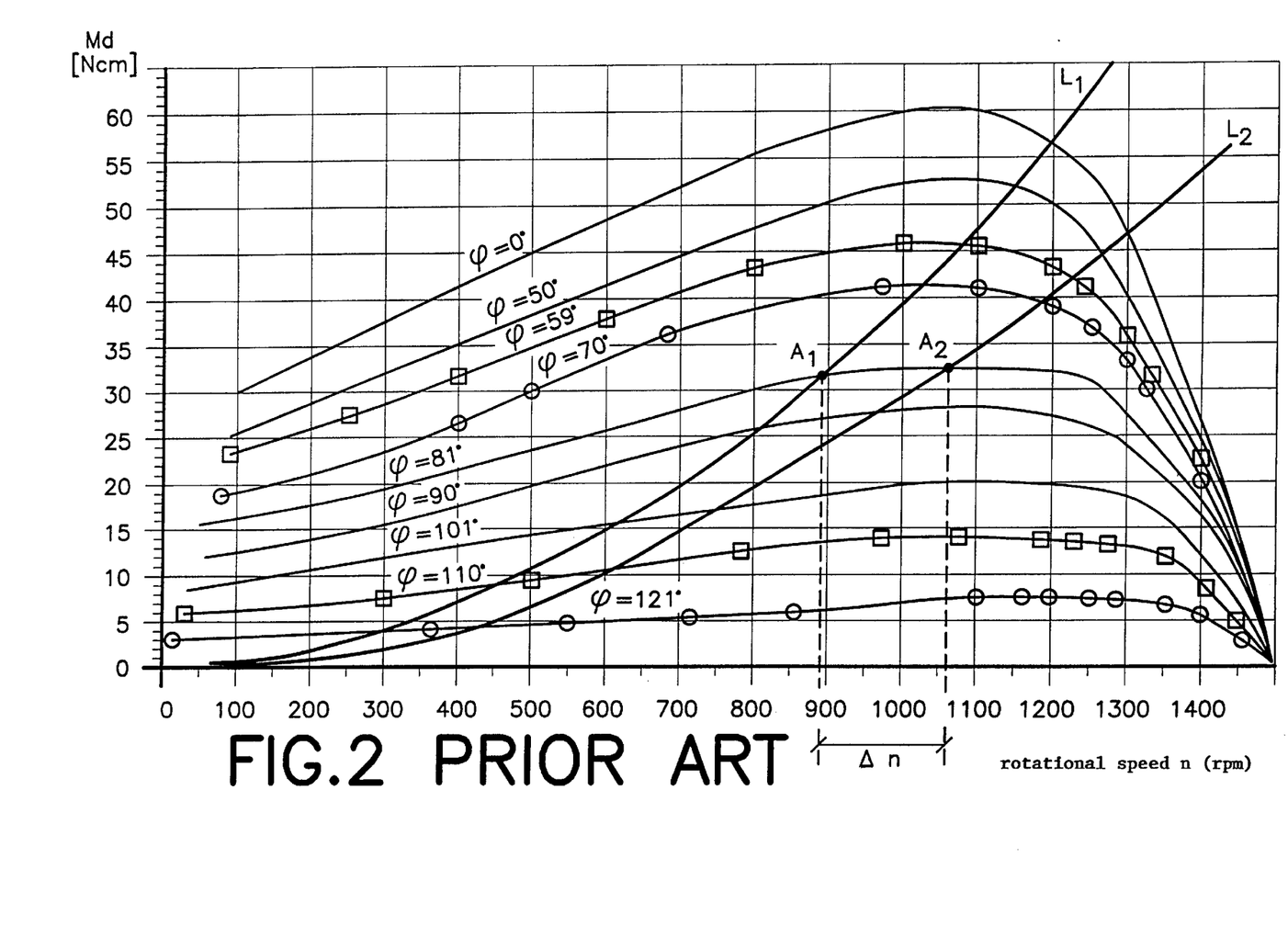
FIG. 2 shows a motor characteristic diagram for such a known control system.

FIG. 2 shows associated motor characteristics which result from different triggering angles. As can be seen from this, the rotation speed, for example, varies considerably by Δn, that is to say by about 170 rpm in the assumed example, on changing from a first load characteristic $L_1$ to a second load characteristic $L_2$ with the assumed operating point changing from $A_1$ to $A_2$. The rotation speed range is thus heavily dependent on the load characteristic, However, such a control system not only varies the amplitude of the motor current, but also produces harmonics. In this case, the vast majority is formed by the third harmonic at 150 Hz. The harmonics cause additional losses, and thus make the efficiency worse. Furthermore, they increase the torque ripple and the noise level.

Figure 3:
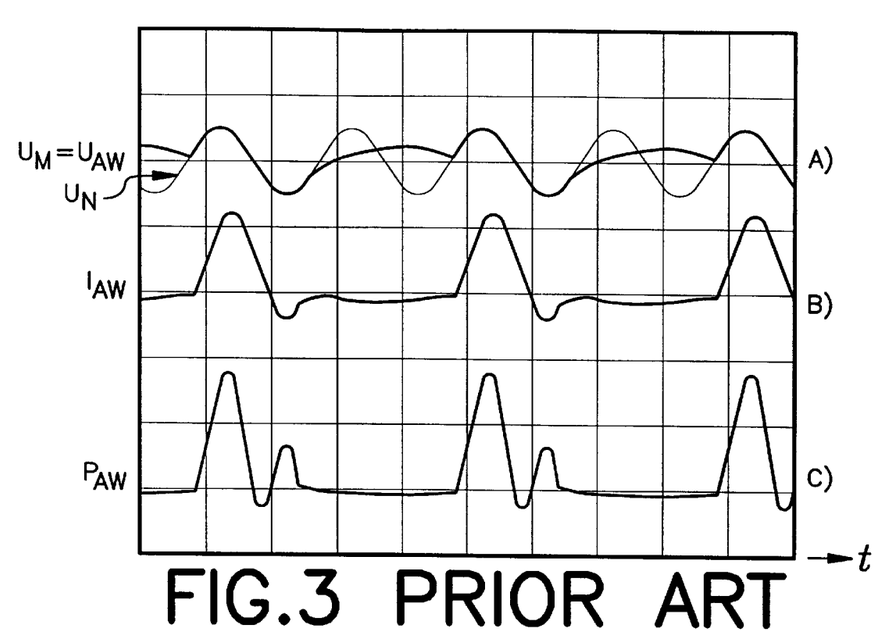
FIG. 3 shows a timing diagram analogous to FIG. 1 for a control system which is likewise known, but in which entire cycles are in each case switched off, without phase gating.

FIG. 3 shows the method of operation of another known control system, in which case entire cycles of the input AC voltage $U_N$ are in each case switched off or passed through. Chopping off half-cycles or full-cycles in this way varies the fundamental frequency of the motor; it is thus operated in a similar way to that with a frequency converter. In the example illustrated in FIG. 3 and at a given power supply frequency of 50 Hz, this results in a frequency of 25 Hz, with which the motor is operated. The motor current $I_M$ resulting from this is then no longer sinusoidal. As FIG. 3 clearly shows, the two current half-cycles are highly asymmetric. It has been found that the reason for this is that the flux decreases during the two switched-off half-cycles. The back-emf during the first switched-on half-cycle is therefore considerably less than during the second, subsequent half-cycle. This leads to the current becoming greater in the first voltage half cycle. This asymmetry causes a DC element in the motor current (zero shift) which on the one hand brakes the motor and on the other hand, owing to additional losses in the winding, also causes a load on the AC power supply. A further disadvantage of this known control principle is that this voltage waveform can cause the motor to saturate, making the efficiency considerably worse. In consequence, the power consumption of the motor at this operating point is considerably greater than for conventional phase-gating control.

Figure 4:
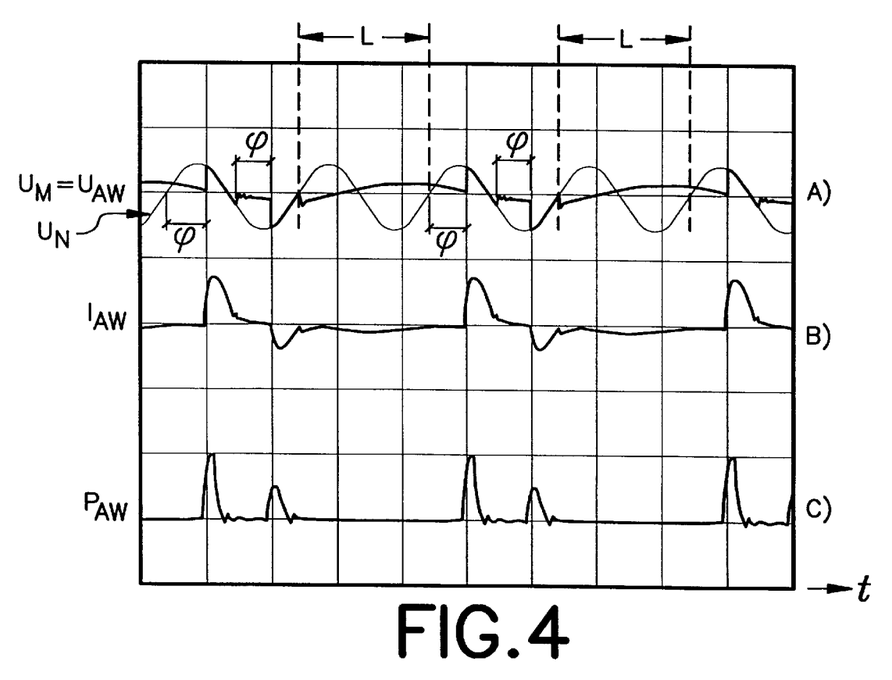
FIG. 4 shows a timing diagram analogous to FIGS. 1 and 3, relating to a first embodiment of the control system according to the invention.

As FIG. 4 now shows, the control system according to the invention is suitable for providing a combination of the two known methods. This means that, on the one hand, the fundamental frequency can be varied by the control unit 4 switching off specific cycles of the sinusoidal input AC voltage $U_N$ in order to form voltage gaps L, and passing through other specific cycles. On the other hand, it is also possible to carry out phase gating of the remaining, successive, positive and negative voltage half-cycles at a specific phase-gating angle φ.

Figure 6:
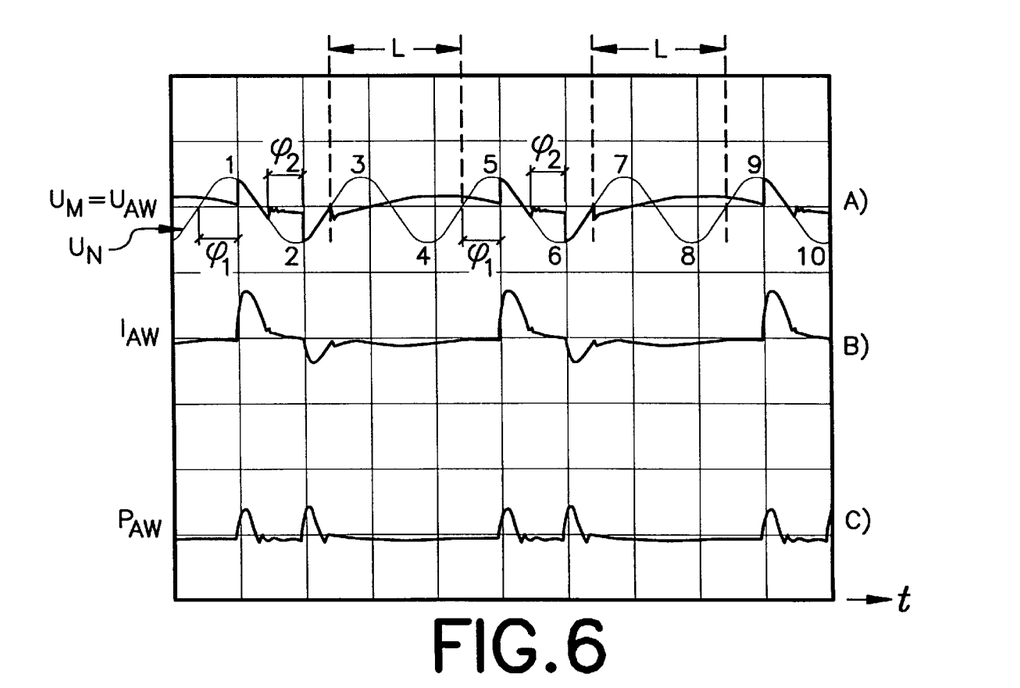
FIG. 6 shows a timing diagram analogous to FIG. 4 relating to a preferred embodiment of the control system according to the invention.

A preferred refinement of the control system shown in FIG. 5 results in, as is shown in FIG. 6, the two half-cycles of a full-cycle following a voltage gap L being gated at different phase-gating angles $φ_1$ and $φ_2$. Specifically, the phase-gating angle $φ_1$, for the first half-cycle is greater than the phase-gating angle for the subsequent, second half-cycle, to be precise in particular in such a way that the motor current $I_M$ resulting from the motor AC voltage $U_M$ produced in this way has a profile which is essentially symmetrical with respect to the zero line.

The first circuit variant, shown in FIG. 5, to this end provides for the control unit 4 to actuate the switching device 2 as a function of zero crossings of the input AC voltage $U_N$ which are detected by means of a zero crossing detection device 6. To this end, the zero crossing detection device 6 is connected to the input AC voltage $U_N$ and is designed in such a manner that, whenever a voltage zero crossing occurs, a control pulse is emitted via a signal line 8 to the control unit 4. This control unit is used to trigger the phase-gating angle. The control unit 4 can in this case preset a specific phase or triggering angle pattern, in such a way that the electronic switching device 2 is used not only to produce the voltage gaps L by switching off specific cycles, but also to gate each of the remaining cycles. A half-cycle is switched off entirely by presetting an angle φ=180° for it.

In this case, as is shown in FIG. 6, it is advantageously possible to vary the triggering angle pattern dynamically. Based on a fundamental frequency reduced, for example, to 25 Hz (by switching off every other full-cycle), the remaining positive and negative half-cycles are respectively gated differently. In this case, the essential factor is that the triggering angle of the respective first half-cycle is greater than the triggering angle of the subsequent, second half-cycle.

As is evident from the example shown in FIG. 6a, the meaning of this is as follows: the half-cycles of the input AC voltage $U_N$ are denoted by the numbers 1 to 10. The first half-cycle is actuated at a triggering angle $φ_1$, of, for example, 113°, and the second half-cycle is actuated at a smaller triggering angle $φ_2$ of, for example, 79°. This is now followed by two half-cycles, which are switched off by the switching device 2 not being actuated. This is achieved by a fictitious triggering angle of 2×180°. The increase (according to the invention) of the triggering angle for the respective first half-cycle after a voltage gap L leads to the half-cycles of the motor current 1 being symmetrical. Since, as already mentioned above, the flux decreases during the voltage gap, the back-emf during the first switched-on half-cycle is considerably less, thus resulting in a greater motor current being formed. The initially greater triggering angle $φ_1$ results in a reduction in the amplitude of the motor voltage, which leads to a reduced current during this current-flow angle. An at least approximately symmetrical motor current and power consumption can be achieved by suitable adaptation of the triggering angle ratio of the positive and negative half-cycles.

The control system according to the invention also varies the synchronous rotation speed. Thus, according to the equation n=f/p the theoretical synchronous rotation speed for a four-pole motor whose number of pole pairs is p=2 at a fundamental frequency of 25 Hz is 750 rpm.

Figure 7:
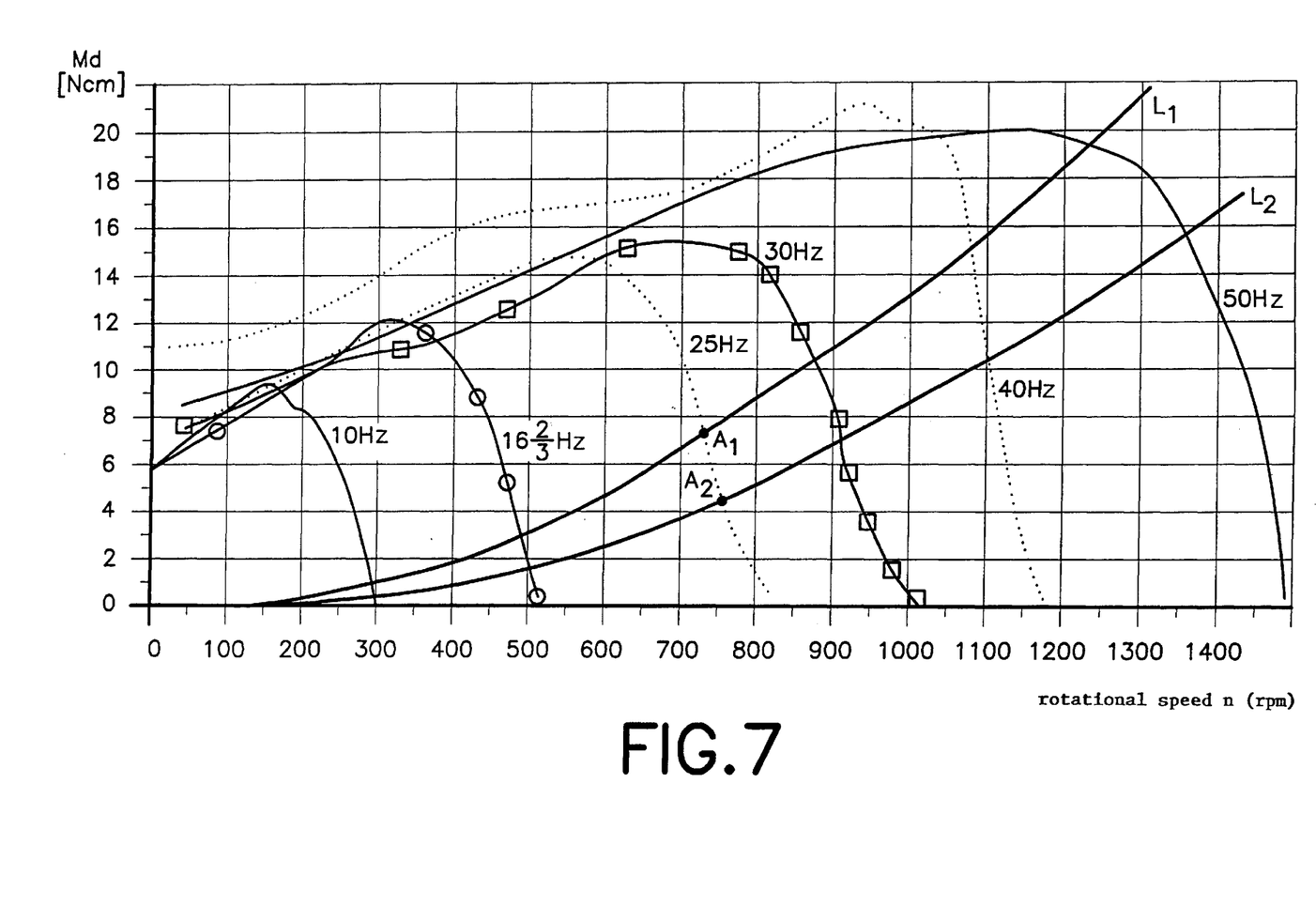
FIG. 7 shows a motor characteristic diagram similar to FIG. 2, but for the control system according to the invention.

The diagram in FIG. 7 shows the torque waveforms for various fundamental frequencies between 10 Hz and 50 Hz. As is evident from this, this results in different synchronous rotation speeds. Certain fundamental frequencies, for example 30 Hz and 40 Hz, could not be achieved at all with the methods known from the prior art. Using the system according to the invention, a 40 Hz fundamental frequency, for example, can be achieved by using the following phase or triggering angle pattern. 0°, 45°, 90°, 135°, 180°, 180° 180° 180° 45° 45°. This triggering angle pattern is then repeated cyclically. As already mentioned above, the angle 180° in this case means that the switching device 2 is not switched on at all by the control unit 1 throughout this phase angle. If one now considers the operating point $A_1$ shown in the family of curves in FIG. 7, which occurs for a motor with a fundamental frequency of 25 Hz on the load characteristic $L_1$, then it can be seen that, when the load characteristic is changed from $L_1$ to $L_2$, the operating point $A_1$ moves to the new operating point $A_2$. It can be seen that the rotation speed of the motor advantageously changes only very slightly. It is therefore possible to say that the rotation speed setting range is virtually independent of the load characteristic.

A further advantage of the actuation system according to the invention is a considerably improved starting torque which, for the same power consumption, may assume values which are virtually twice those of conventional phase-gating control systems. If the triggering angle pattern is selected appropriately, it is, however, also possible to achieve considerably reduced energy consumption for the same starting torque.

As has already been mentioned above with reference to a conventional rotation speed control system using phase gating, harmonics are produced in the main winding and auxiliary winding, with the vast majority being formed by the third harmonic at 150 Hz. The control system according to the invention produces different current spectra. Thus, for example, a control circuit which works at an operating frequency of 25 Hz essentially produces 25 Hz, 50 Hz and 75 Hz elements. In conjunction with the mechanical system, the various spectra can produce different acoustic noise, which can be minimized by suitable selection of specific triggering angle patterns. As a result of these additional capabilities to optimize noise, is possible to avoid the 100 Hz humming that is typical for conventional phase-gating control systems.

As is also evident from FIG. 5, the electronic switching device 2 in this exemplary embodiment is preferably formed by a triac 10, which is connected upstream of and in series with the motor M and whose gate G is actuated via a control line 12 from the control unit 4, in particular a microcontroller or ASIC. According to FIG. 5, joint actuation of the main winding AW and auxiliary winding HW via the common triac 10 is envisaged in this case.

Figure 8:
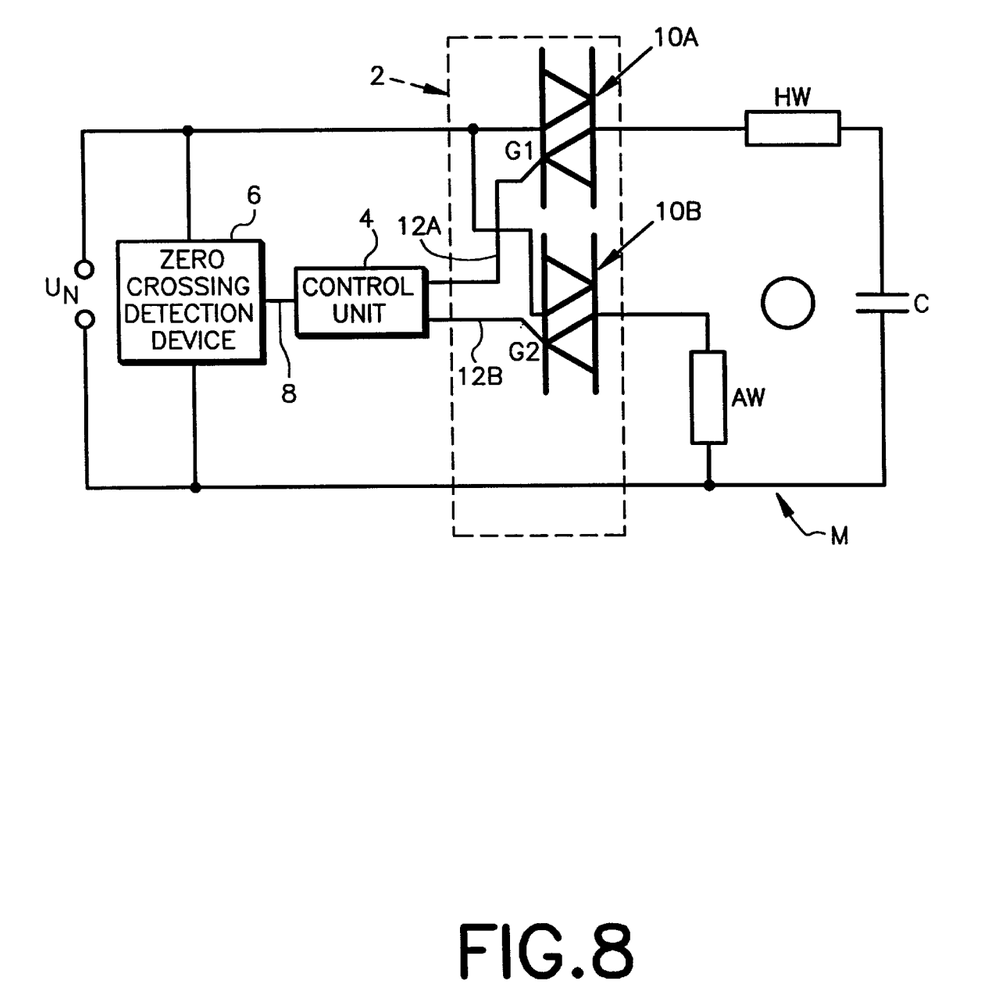
FIG. 8 shows a block diagram of a second circuit variant of the system according to the invention.

In the second circuit variant, shown in FIG. 8, the switching device 2 contains two individual power switches, preferably triacs 10a and 10b, whose gates G1, and G2 are actuated separately by the control unit 4 via control lines 12a, 12b. An additional driver stage can also be provided between the control unit 4 and the power switches. This actuation is also carried out as a function of the zero crossings of the input AC voltage $U_N$. In the case of the first variant shown in FIG. 5, the current in the main winding and auxiliary winding in each case builds up at the same time so that there is no phase shift between the main winding and auxiliary winding shortly after triggering, the two windings are now actuated separately in the case of the circuit shown in FIG. 8. The current in the auxiliary winding is started earlier and once again builds up the flux, which was reduced in the voltage gap as a function of the rotor time constant, so that the current in the main winding can also produce a torque immediately. A further advantage is that the magnitudes of the currents in the main winding and auxiliary effects lead to winding can be set independently of one another. These effects leads to a further improvement in the efficiency. For example, for such a circuit, it is possible to use an actuation angle pattern which produces a fundamental frequency of 25 Hz and which operates with the actuation angles $\phi_1$ and $\phi_2$, 180°, 180° for the auxiliary winding and with 180°, $\phi_3$, $\phi_4$, 180° for the main winding ($\phi_1$ to $\phi_4$ are variable).

Figure 9A:
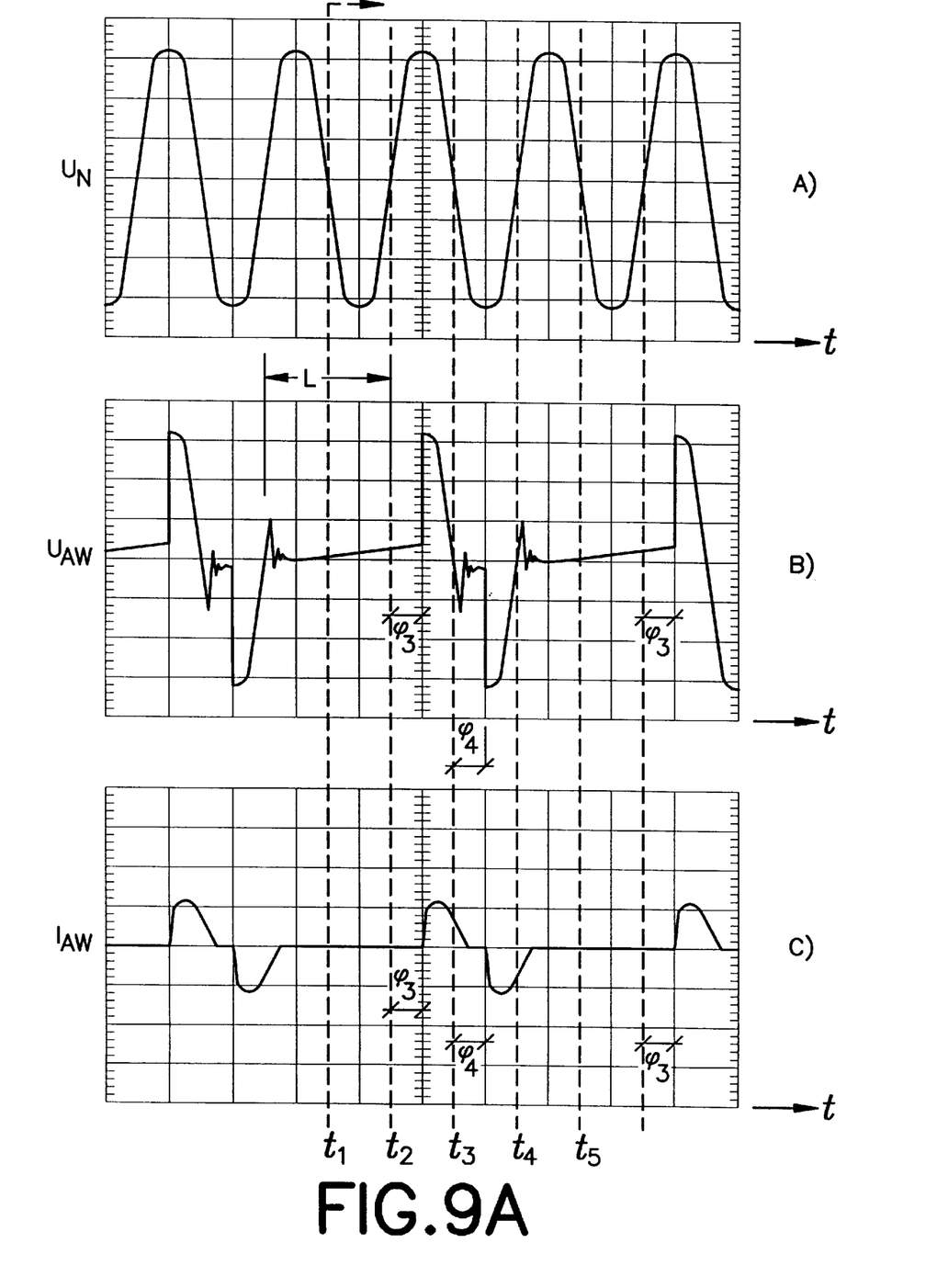
FIG. 9 shows voltage and current waveforms relating to the second circuit variant shown in FIG. 8.
Figure 9B:
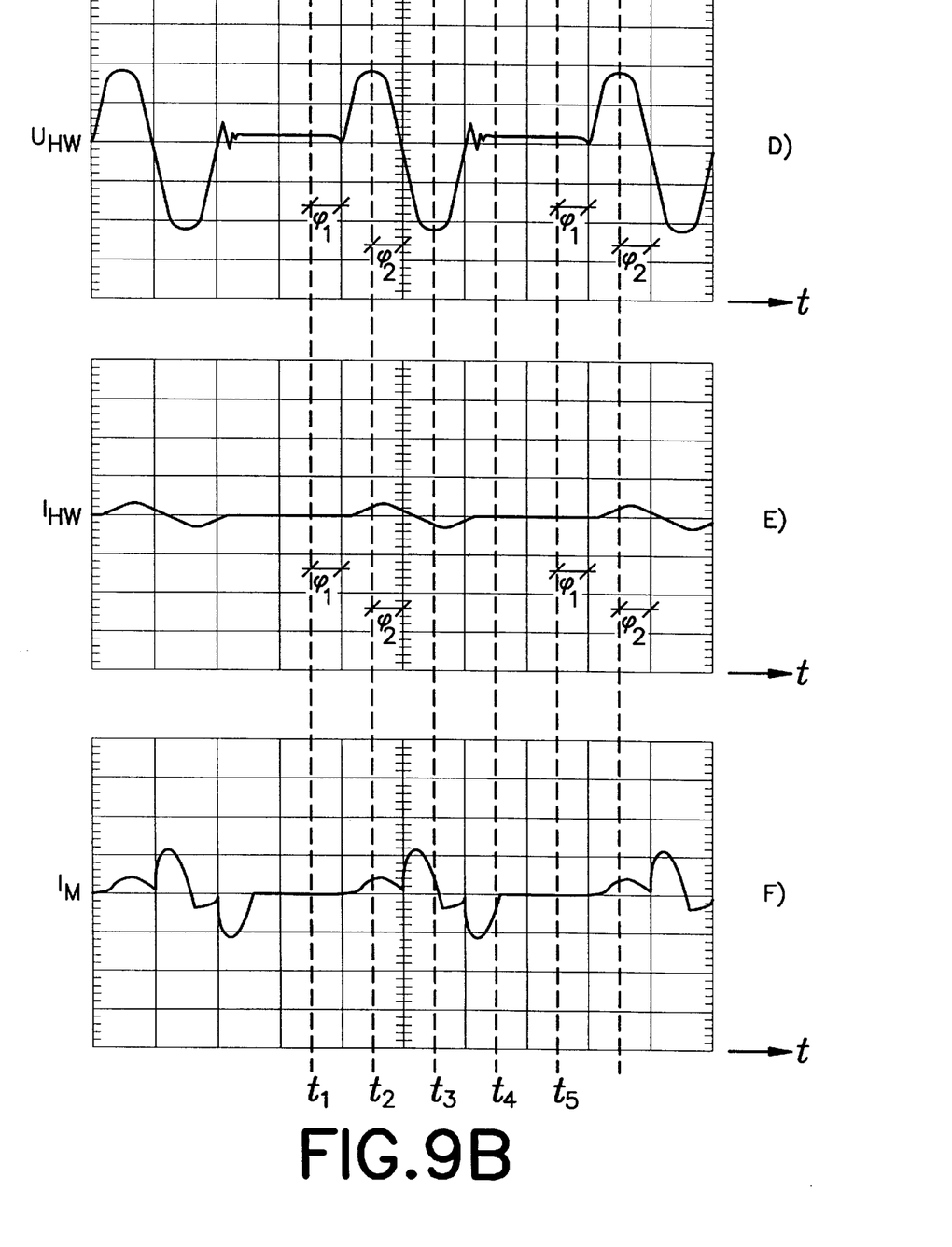

By way of example, FIG. 9 shows one specific actuation pattern. In this case, the auxiliary winding operates with the values $\phi_1=92°$, $\phi_2=99°$, 180°, 180° while the main winding is actuated by 180°, $100_3=88°$, $\phi_2=99°$, 180°. In this specific example, FIG. 9a shows the input AC voltage $U_N$. FIG. 9b shows the voltage $U_{AW}$ on the main winding, and FIG. 9d shows the voltage $U_{HW}$ on the auxiliary winding. FIGS. 9c and 9e show the associated currents $I_{AW}$ through the main winding and $I_{HW}$ through the auxiliary winding. As can be seen from FIGS. 9d and 9e, the auxiliary winding is switched on first of all from the time $t_1$, the zero crossing of the input voltage $U_N$ in FIG. 9a, with a triggering angle $\phi_1$, so that a current $I_{HW}$ can flow through the auxiliary winding. The main winding has not yet been switched on at this time. At the next input voltage zero crossing at the time $t_2$ current now flows through the main winding with a triggering angle $\phi_3$, and through the auxiliary winding with a triggering angle $\phi_2$. At the time $t_3$ that is the next input voltage zero crossing, the main winding is once again switched on with a triggering angle $\phi_4$, while the auxiliary winding is not triggered. At the next voltage zero crossing at the time $t_4$ neither of the two triacs is triggered, so that the currents through the main winding and auxiliary winding are switched off. The described triggering patterns are then repeated from the time $t_5$. The motor current $I_M$ shown in FIG. 9f is the resultant of the sum of the winding currents and the currents in the main winding and the auxiliary winding can thus be set independently of one another by varying the triggering angle patterns, making it possible to influence not only the torque characteristic but also the power consumption of the motor towardly. The capability to keep the current amplitude in the auxiliary winding greater and to achieve a more advantageous phase angle for the auxiliary winding currents thus also results in a considerably better efficiency.

Figure 10:
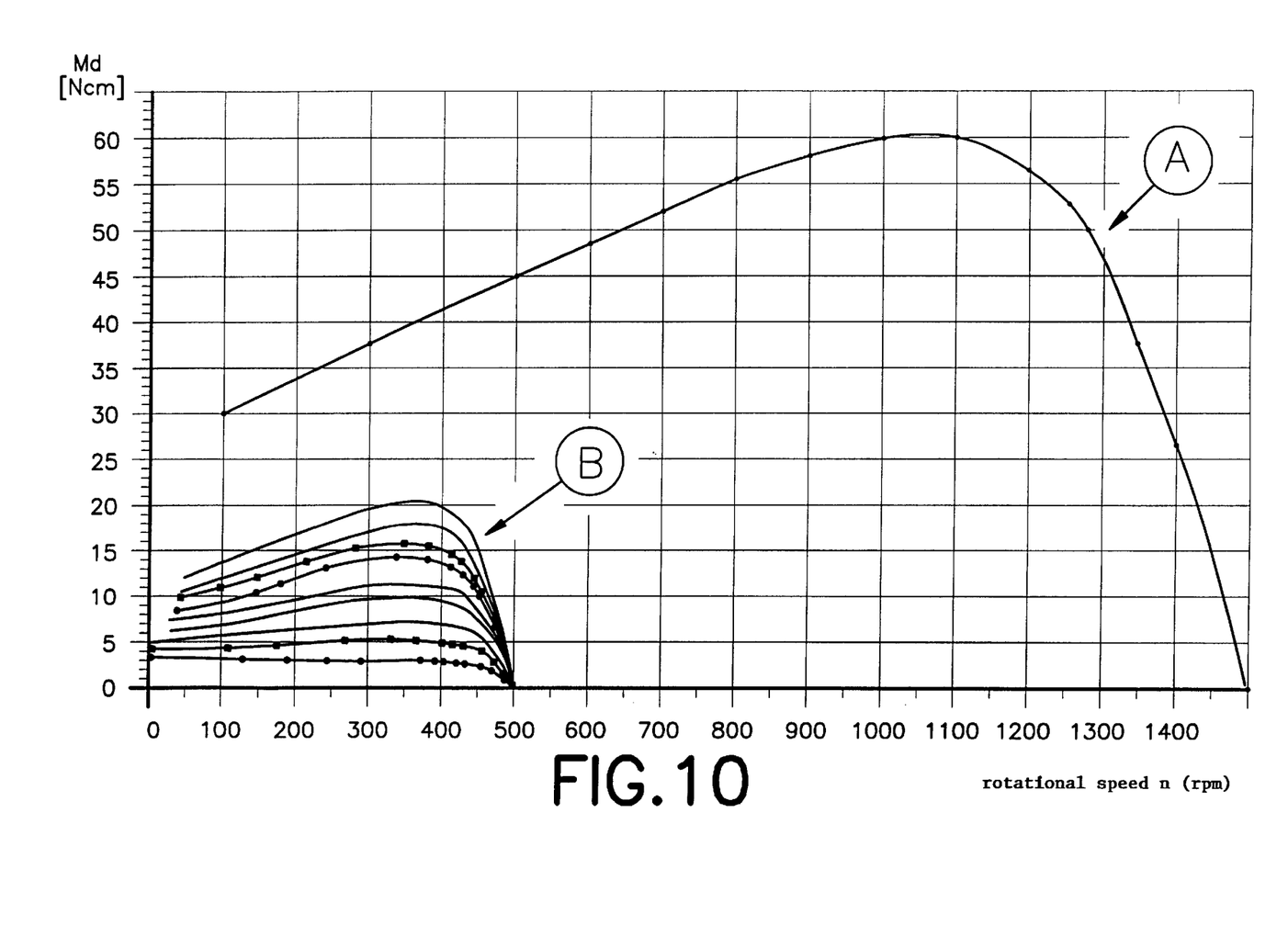
FIG. 10 shows a family of measured torque characteristics for the circuit shown in FIG. 8, compared with the torque characteristic of a motor which is operated directly from the power supply without any control system.

FIG. 10 shows a rotation speed/torque characteristic A for a motor which is operated directly from the power supply and has no control system, compared to the corresponding characteristics B for a motor which is operated according to the invention, by means of separate actuation of the main winding and auxiliary winding. According to the invention, a triggering pattern is provided which sets, for example, a motor fundamental frequency of 16⅔ Hz. For this example, a triggering pattern with triggering angles of 0°, 180°, 180° for the main winding AW and of 180°, 180°, 97° for the auxiliary winding HW has been found to be particularly advantageous for efficiency and the torque response. Varying the magnitude and/or the profile of the torque, as is shown in the family of characteristics B in FIG. 10, can in this case be achieved by varying the first triggering angle of the main winding, in which case the change in the triggering angle influences the amplitude of the motor voltage. Switching on the main winding and auxiliary winding separately but, according to the invention, such that they are matched to one another, also results, with this embodiment, in a considerable improvement in the starting torque of the motor, in this case even reaching values which correspond to virtually twice the value for conventional phase-gating control. Furthermore, it is possible without any additional hardware, that is to say only by varying the triggering angle pattern, to change the direction of the rotation speed. Triggering angles of 30°, 180°, 180° for the main winding and of 180°, 120°, 180° for the auxiliary winding have been found to be particularly advantageous in this case.

In addition to the already mentioned advantages, it is also possible with the variant shown in FIG. 8 to advantageously influence the acoustic noise from the motor. If it is found in practice that a unit which is driven by the respective motor is stimulated to vibrate or oscillate, then, by varying the triggering angle pattern, it is even possible to change the motor current so that the disturbing oscillations or vibration are or is at least reduced, even if not eliminated.

For both the versions shown in FIG. 5 and FIG. 8, the simplest and most economic option is to empirically determine the optimum triggering angles, to be precise in order to optimize the efficiency and/or starting torque and/or oscillation or vibration and/or noise response and/or the torque/rotator-speed characteristic. The results determined in this way can be stored in tabular form in memory means of the control unit 4. The stored triggering patterns are then preset in a cyclically recurring manner for the switching device 2. However, if the control unit 4 is formed by a microcontroller or digital signal processor (DSP) with sufficiently high computation power, optimization of the motor can even be carried out during on line operation as well. For this purpose, the output signals from suitable sensors, such as sensors for the rotation speed, current, power, temperature, airflow rate, air pressure, air speed, air humidity and/or vibration or oscillation, are evaluated by the control unit 4, and are taken into account in the selection of the triggering angles.

Figure 11:
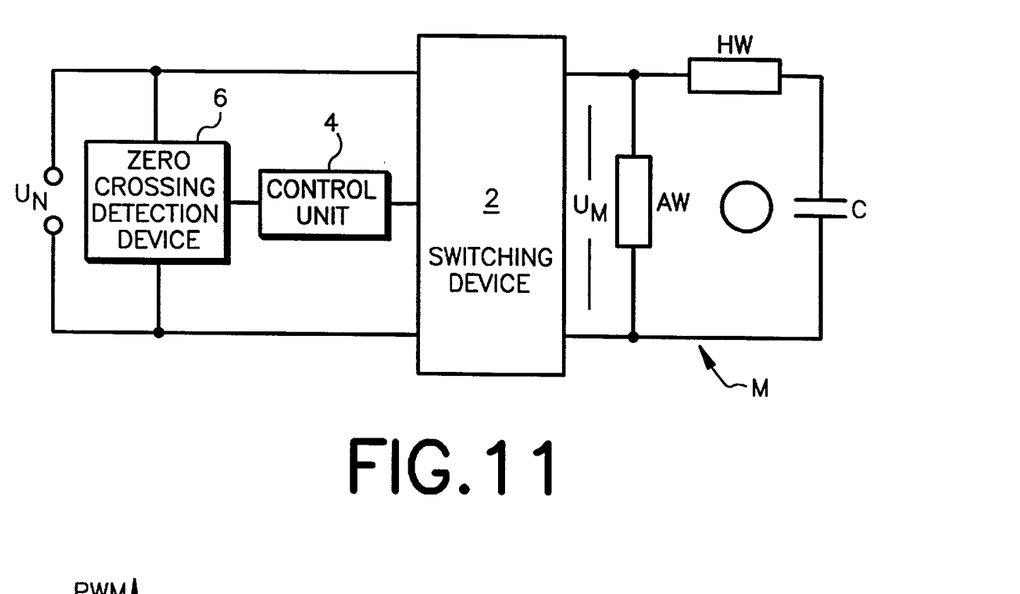
FIG. 11 shows a block diagram of a third circuit variant, as an alternative to FIGS. 5 and 8.

With regard to the third circuit variant, shown in FIG. 11, the electronic switching device 2 is in this case formed by a pulse-width modulated AC power controller, which is designed and actuated in such a manner that the method of operation of the configurations shown in FIG. 5 and/or 8 is essentially "simulated", in order likewise to optimize the efficiency and/or torque and/or torque/rotation speed characteristic. The internal construction of such an AC power controller is known per se, and is therefore not shown in any more detail in FIG. 11.

In the case of such an AC power controller, also called an AC chopper (see, for example, DE 44 28 682 C2), the amplitude of the motor voltage can be changed in an infinitely variable manner since power switches which can be switched off are used in this case, for example bipolar transistors, MOSFETs, IGBTs etc., which can interrupt the current actively in contrast to triacs and thyristors. In this case, the power switches are typically clocked at a frequency of 18 to 20 kHz, that is to say at a frequency which is outside the human hearing range.

In the case of an AC power controller, motor currents which are sinusoidal to a good approximation are produced with a fundamental frequency corresponding to the power supply frequency, that is to say typically at 50 Hz or 60 Hz, with considerably fewer harmonics being produced than with a phase-gating control system. Although this is advantageous with regard to acoustic noise, it has the disadvantage of high power losses since, however, as in the case of conventional phase gating control, the rotation speed setting acts as pure slip control. This often leads to thermal problems, poor efficiency and severe air heating which, particularly in the case of heat exchangers for example, further reduces the overall efficiency of the installation.

Measurements have shown that the power consumption of the AC power controller is in some cases increased by more than 60% in comparison with the solutions illustrated in FIGS. 5 and 8. The solution illustrated in FIG. 11 therefore, has the object of actuating an AC power controller in such a way that it is possible to achieve a high efficiency, corresponding to FIGS. 5 and 8.

Figure 12:
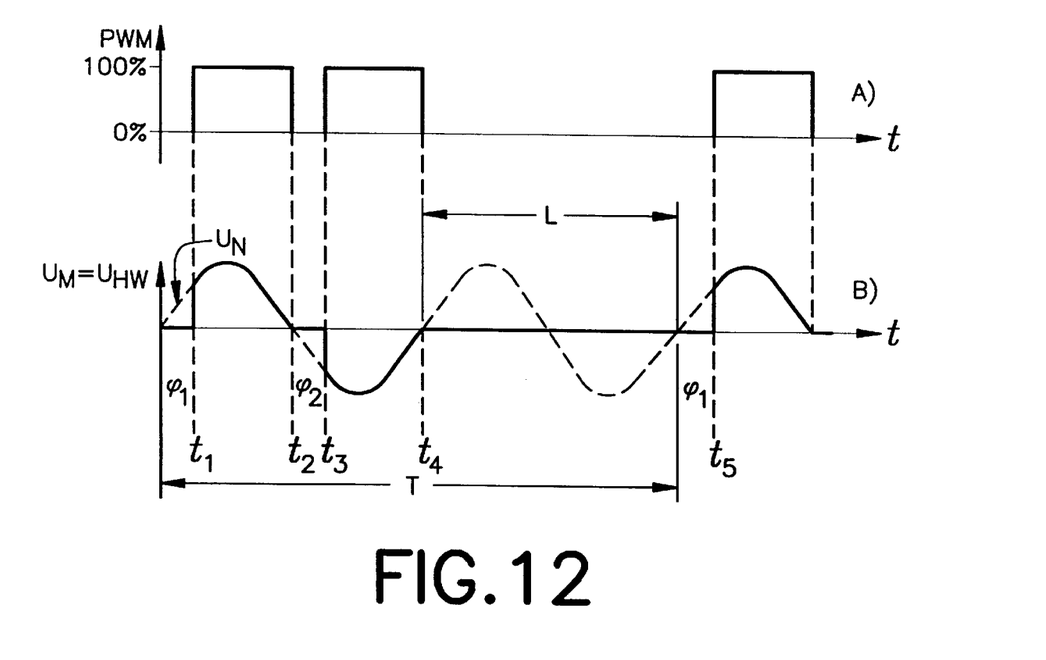
FIG. 12 shows a diagram relating to the embodiment shown in FIG. 11.

According to the invention, this AC power controller is actuated by the control unit 4 with a variable PWM ratio, in such a manner that, in consequence and analogously to the configurations shown in FIGS. 5 and 8, it is possible to produce a corresponding profile for the motor voltage $U_M$. If, for example, entire half/full-cycles of the input voltage are to be switched off, then this results in a PWM ratio of 0%; for the corresponding phase angle of 180° per half cycle (see FIG. 12). A PWM ratio of 100° means that the input voltage is passed through entirely over the corresponding angle. Accordingly, "phase-gating" can also be carried out in practice by presetting 0% PWM up to a variable phase or triggering angle φ, with 100% PWM after this.

In this case as well, the control unit 4 uses the zero crossings detected by the detection device 6 to supply the control signals for the power switches in the AC power controller.

FIGS. 12a and b show how the voltage on the main winding and auxiliary winding can be influenced by a PWM control system. At the times $t_1$, $t_3$, $t_5$ at which the power switches are intended to he switched on, a 100% PWM signal is preset, so that the motor receives the entire input AC voltage $U_N$. At 0% PWM the motor voltage is short circuited via a freewheeling circuit at the times $t_2$, $t_4$ so that the motor voltage tends to zero. In order to simulate even better the relationships of the circuit variants described above and shown in FIGS. 5 and 8, a PWM ratio that is slightly higher corresponding to the emf can also be preset, instead of 0% PWM.

A fundamental frequency of 25 Hz is achieved with the exemplary embodiment illustrated in FIG. 12b. However, other fundamental frequencies can also be produced (for example 16⅔ Hz, 30 Hz, 40 Hz etc.) by appropriate modulation of the PWM signal, which, in consequence, leads to optimization of the operating point. This allows the efficiency, starting torque and/or torque/rotation-speed characteristic to be improved further.

Furthermore, it is possible to switch over between the proposed control mode and conventional control with a constant PWM ratio. It is thus possible to achieve either the improvements listed above, or to achieve low-noise operation, with a constant PWM ratio and approximately sinusoidal currents. Low-noise operation may be useful, for example, at night and/or for operating points at a low rotation speed. In the case of fan applications using relatively high rotation speeds, flow noise is generally more significant than motor noise. At this operating point, it then makes sense to use the proposed control system to minimize the power consumption, for example.

However, the invention is not limited to control with 0% or 100% PWM values or to the simulation of a triac circuit but, in fact, represents a general solution for the use of AC power controllers as frequency converters. In order to vary the fundamental frequency, either the PWM signal or, directly, the times at which the power switches in the AC power controller are switched on and off are controlled in a periodically recurring manner. The level of freedom achieved in this way can be used to optimize the efficiency and starting torque, to reduce the acoustic noise and/or to improve the EMC characteristics.

The invention is not limited to the illustrated and described exemplary embodiments, but also covers all configurations having an equivalent effect for the purposes of the invention.

What is claimed is:

1. A system for controlling the rotational speed of a single phase AC motor comprising a controllable electronic switching device which is connected upstream of the AC motor and is actuated by a control unit such that a constant frequency sinusoidal input AC voltage is used to produce a motor AC voltage which can be varied in order to change the rotation speed, wherein the control unit provides that the fundamental frequency of the motor AC voltage can be varied by phase-gating.

2. The system of claim 1, wherein the amplitude of the motor AC voltage can be varied by phase-gating.

3. The system of claim 2, wherein the amplitude of the motor AC voltage can be varied by individual half-cycles of a waveform having periodically recurring trigger angles during phase-gating.

4. The system of claim 1, wherein the fundamental frequency of the AC motor voltage can be varied by individual half cycles of a waveform having periodically recurring triggering angles during phase gating.

5. The system of claim 1, wherein specific cycles of a sinusoidal input AC voltage are completely switched off by the control unit in order to form voltage gaps.

6. The system of claim 1, wherein the phase gating of successive positive and negative voltage half-cycles can be carried out using different phase-gating angles.

7. The system of claim 5, wherein, for half-cycles which follow a voltage gap the phase-gating angle of the first half-cycle is greater than the phase-gating angle of the second half-cycle whereby a motor current resulting from the motor AC voltage produced in this way has a profile which is essentially symmetrical with respect to the zero line.

8. The system of claim 1, wherein the fundamental frequency of the motor voltage is ¼ of the power supply frequency.

9. The system of claim 1, wherein the control unit actuates the switching device as a function of zero crossings of the input AC voltage detected by a zero-crossing detection device.

10. The system of claim 1, wherein the single phase AC motor has a main winding and an auxiliary winding in parallel with the main winding, said auxiliary winding is connected in series with a capacitor, wherein said main winding and said auxiliary winding are jointly actuated by the control unit.

11. The system of claim 1, wherein the single phase AC motor has a main winding and an auxiliary winding in parallel with the main winding is connected in series with a capacitor, wherein said main winding and said auxiliary winding are actuated by means of separate power switches, by the control unit.

12. The system of claim 1, wherein the electronic switching device has at least one thyristor which is connected in the motor circuit and the gate of the thyristor is actuated with a variable triggering angle pattern by the control unit, via a control line.

13. The system of claim 1, wherein a driver circuit is connected between the control unit and the switching device.

14. The system of claim 1, wherein the control unit is a microprocessor.

15. The system claim 1, wherein the control unit has memory means for tabular storage of triggering angle patterns for operating points.

16. The system of claim 1 further comprising a rotation speed sensor, wherein the control unit adapts the triggering angle patterns during operation by evaluation of the sensor signals.

17. The system of claim 1, wherein the motor rotation direction can be varied by means of suitably selected triggering patterns.

18. The system of claim 1, wherein the electronic switching device is formed by an AC power controller.

19. The system of claim 18, wherein the electronic control unit presets the PWM ratio of the AC power controller.

20. The system of claim 18, wherein the electronic control directly controls the switching states of the electronic switching device.

21. The system of claim 18, wherein the control unit can be varied between a control mode with a variable fundamental frequency, and pure slip control.

22. The system of claim 1, wherein the fundamental frequency of the motor voltage is $\frac{1}{3}$ of the power supply frequency.

23. The system of claim 1, wherein the fundamental frequency of the motor voltage is $\frac{1}{2}$ of the power supply frequency.

24. The system of claim 1, wherein the fundamental frequency of the motor voltage is $\frac{2}{3}$ of the power supply frequency.

25. The system of claim 1, wherein the fundamental frequency of the motor voltage is $\frac{4}{5}$ of the power supply frequency.

26. The system of claim 1, wherein the control unit is a microcontroller.

27. The system of claim 1, wherein the control unit is a digital signal processor.

28. The system of claim 1, wherein the control unit is an ASIC.

29. The system of claim 1 further comprising a power sensor, wherein the control unit adapts the triggering angle patterns during operation by evaluation of the sensor signals.

30. The system of claim 1 further comprising a temperature sensor, wherein the control unit adapts the triggering angle patterns during operation by evaluation of the sensor signals.

31. The system of claim 1 further comprising an air volume sensor, wherein the control unit adapts the triggering angle patterns during operation by evaluation of the sensor signals.

32. The system of claim 1 further comprising an air pressure sensor, wherein the control unit adapts the triggering angle patterns during operation by evaluation of the sensor signals.

33. The system of claim 1 further comprising an air speed sensor, wherein the control unit adapts the triggering angle patterns during operation by evaluation of the sensor signals.

34. The system of claim 1 further comprising an air humidity sensor, wherein the control unit adapts the triggering angle patterns during operation by evaluation of the sensor signals.

35. The system of claim 1 further comprising a vibration sensor, wherein the control unit adapts the triggering angle patterns during operation by evaluation of the sensor signals.

36. The system of claim 1 further comprising an oscillation sensor, wherein the control unit adapts the triggering angle patterns during operation by evaluation of the sensor signals.

* * * * *